(12) United States Patent  
Kuo et al.

(10) Patent No.: US 9,355,179 B2
(45) Date of Patent: May 31, 2016

(54) VISUAL-CUE REFINEMENT OF USER QUERY RESULTS

(75) Inventors: Yu-Ting Kuo, Sammamish, WA (US); Yi Li, Issaquah, WA (US); Fang Wen, Beijing (CN); Qifa Ke, Cupertino, CA (US); Jian Sun, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 12/890,097

(22) Filed: Sep. 24, 2010

(65) Prior Publication Data

US 2012/0078936 A1 Mar. 29, 2012

(51) Int. Cl.
*G06F 17/30* (2006.01)

(52) U.S. Cl.
CPC .............................. *G06F 17/30867* (2013.01)

(58) Field of Classification Search
USPC ......................................................... 707/766
See application file for complete search history.

(56) References Cited

U.S. PATENT DOCUMENTS

| | | | |
|---|---|---|---|
| 6,804,683 B1 * | 10/2004 | Matsuzaki et al. | |
| 7,502,786 B2 * | 3/2009 | Liu et al. | |
| 7,698,657 B2 | 4/2010 | Gemmell et al. | |
| 8,150,824 B2 * | 4/2012 | Marmaros et al. | 707/706 |
| 2003/0014403 A1 | 1/2003 | Chandrasekar et al. | |
| 2003/0135725 A1 | 7/2003 | Schirmer et al. | |
| 2005/0097188 A1 | 5/2005 | Fish | |
| 2005/0261990 A1 | 11/2005 | Gocht et al. | |
| 2006/0106793 A1 | 5/2006 | Liang | |
| 2006/0277200 A1 | 12/2006 | Weiss et al. | |
| 2007/0130129 A1 * | 6/2007 | Wagle | 707/3 |
| 2008/0027928 A1 * | 1/2008 | Larson | 707/5 |
| 2008/0033915 A1 | 2/2008 | Chen et al. | |
| 2009/0083232 A1 * | 3/2009 | Ives et al. | 707/3 |
| 2009/0254539 A1 | 10/2009 | Wen et al. | |
| 2009/0313239 A1 | 12/2009 | Wen et al. | |
| 2009/0322756 A1 | 12/2009 | Robertson et al. | |

(Continued)

FOREIGN PATENT DOCUMENTS

| | | |
|---|---|---|
| CN | 101000607 A | 7/2007 |
| CN | 101359332 A | 2/2009 |

OTHER PUBLICATIONS

Ozgur Turetken, et al., "Clustering-Based Visual Interfaces for Presentation of Web Search Results: An Empirical Investigation"; Information Systems Frontiers, vol. 7, Issue 3, pp. 273-297; published Jul. 2005 Springer Science + Business Media, Inc., Manufactured in the Netherlands; http://portal.acm.org/citation.cfm?id=1084682.

(Continued)

*Primary Examiner* — Son T Hoang
(74) *Attorney, Agent, or Firm* — Dave Ream; Tony Wong; Micky Minhas

(57) ABSTRACT

Methods and computer-storage media having computer-executable instructions embodied thereon that facilitate refining query results using visual cues are provided. Query results are determined in response to an indication of a user query. One or more groups of query results are generated from the query results based on categories of query results that share similar features. Visual cues are associated with each of the query result groups. Visual cues, in association with query result groups, are presented to a user. Query results associated with a selected visual cue may be presented to a user. A refined user query may be generated based on a selected visual cue.

20 Claims, 6 Drawing Sheets

(56) References Cited

U.S. PATENT DOCUMENTS

2010/0082610 A1 4/2010 Anick et al.
2011/0004588 A1* 1/2011 Leitersdorf et al. .......... 707/711
2011/0225156 A1* 9/2011 Pavlik .......................... 707/737

OTHER PUBLICATIONS

Oren Zamir, et al., "Grouper: A Dynamic Clustering Interface to Web Search Results"; 15 pages; Department of Computer Science and Engineering, University of Washington, Seattle, Washington; retrieved date: May 4, 2010; http://www8.org/w8-papers/3a-search-query/dynamic/dynamic.html.

PCT International Search Report and Written Opinion of the International Searching Authority mailed Feb. 29, 2012 regarding PCT/US2011/048264 8 pages.

PCT (China) First Office Action dated Oct. 25, 2012 regarding PCT/US2011/048265 39 pages.

"Fifth Office Action Received for Chinese Patent Application No. 201110285470.3", Mailed Date: Apr. 7, 2015, 14 Pages.

Chinese Office Action dated Sep. 23, 2014 in Chinese Application No. 201110285470.3, 6 pages.

* cited by examiner

VISUAL-CUE REFINEMENT OF USER QUERY RESULTS

BACKGROUND

User queries generate a variety of results when entered into a search result webpage. Such results may include links to articles, videos, images, and a variety of other types of information that may or may not be relevant to a user's original query. Often the amount of information presented with respect to each query result is minimal, providing little guidance for the user's ultimate result selection.

In some instances, a user enters a particular user query that fails to accurately represent the nature of the user's request. For example, the user may enter a generic term without understanding or recognizing that there is a more specific term for what the user intended to research. Search results webpages use a variety of methods to decipher user intent, specifically when determining the types of results presented to a user and the manner in which such results are displayed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to refining query results using visual cues. In embodiments, a user enters an indication of a user query. For example, a user may enter a query into a designated area of a search results webpage. Query results are determined in response to the user query. The query results may be derived from a variety of sources, such as various search engines. In some embodiments, the query results that are determined in response to a user query are gathered based on the creation of an expanded and/or alternate user query. The results from the original user query, the expanded and/or alternate user query, or both, are used to generate groups of query results. A group of query results refers to a coordinated set of query results that are identified as sharing common characteristics and/or being associated with a representative category of results. For example, such identified characteristics may be in similar features, such as common images or particular wording, that are associated with multiple results.

Based on the groups of query results, visual cues associated with each of the groups are generated. Such visual cues may be textual, such as a caption associated with the group of query results. In other embodiments, a visual cue may be an image associated with a group of query results. In further embodiments, visual cues may be both images and textual items. Visual cues associated with groups of query results are presented to a user. In some instances, based on a user's selection of a visual cue, a second user query is generated. This second user query references query results based on the group of query results associated with the selected visual cue. In other embodiments, based on a user's selection of a visual cue, the original query results that were grouped together and associated with the selected visual cue, are presented to the user.

BRIEF DESCRIPTION OF THE DRAWINGS

The present invention is described in detail below with reference to the attached drawing figures, wherein.

DETAILED DESCRIPTION

Figure 1:
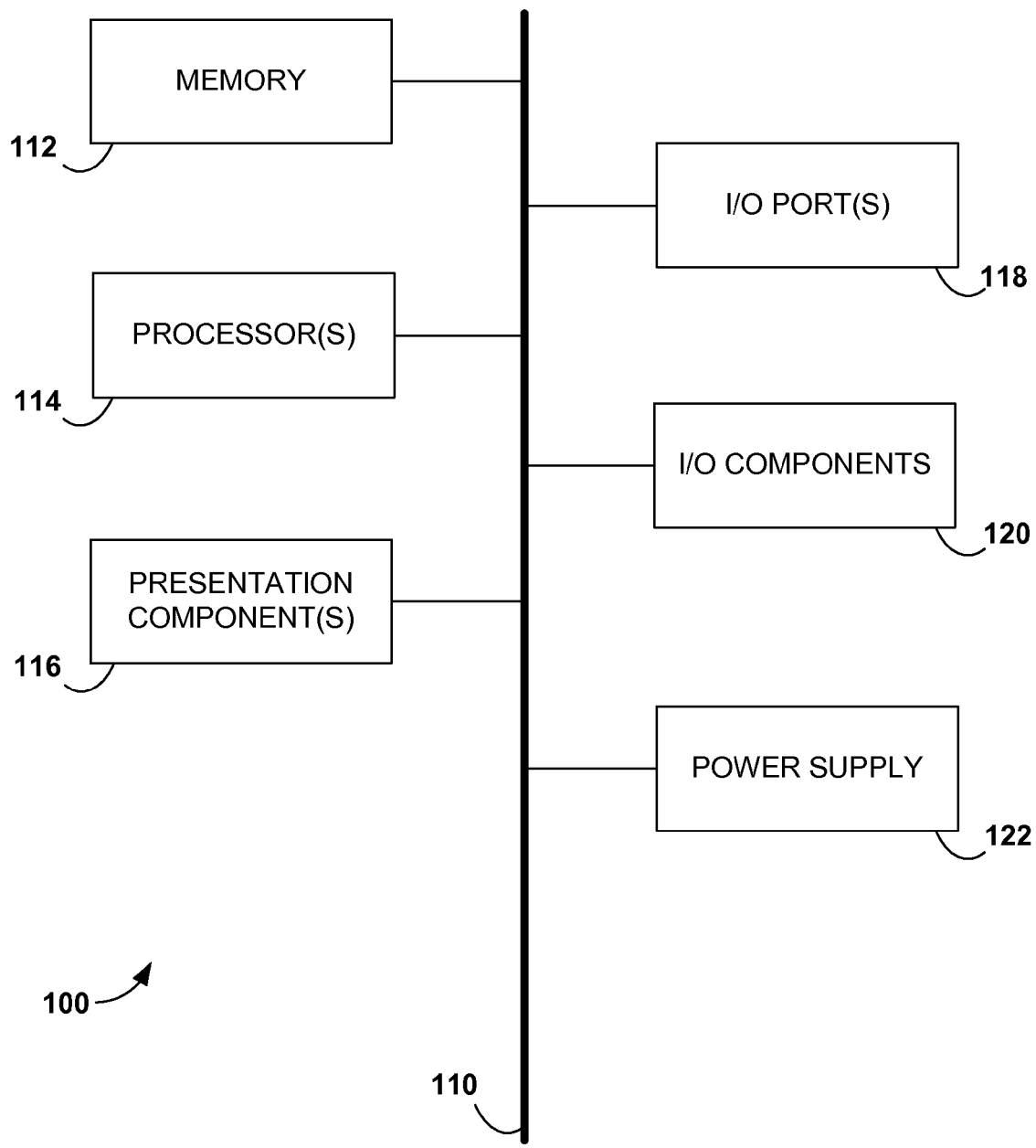
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to refining search results using visual cues. More particularly, visual cues associated with groups of query results are used to determine which query results are most relevant to a particular user query. In some embodiments, visual cues are also used to generate a subsequent, or second, user query based on the group of query results associated with a user-selected visual cue.

In embodiments, an indication of a user query is received. In response to the user query, query result candidates are determined. As previously discussed, query results may be derived from a variety of sources, such as from multiple types of search engines. Query results are coordinated into groups of query results. In one embodiment, query results are grouped based on common characteristics identified among portions of the query results. For example, the identified characteristics may include a common image associated with two or more of the query results. In another embodiment, query results are categorized into groups of query results. As such, based on representative categories, groups of query results are generated.

A visual cue is associated with each group of query results. In one embodiment, a representative image is associated with each group of query results. Such a representative image may be derived from one or more query results associated with the group of query results. In another embodiment, a representative textual item is associated with a group of query results as a visual cue. A visual cue associated with a group of query results may include one or both of a representative textual item and a representative image.

Visual cues are presented for viewing by a user. In some embodiments, based on a user selection of one or more presented visual cues, a second, or subsequent, user query is generated. A second user query generates query results related to the group of query results associated with the selected visual cue. As such, the query results of a second user query may include the same results as those associated with the selected visual cue and/or provide additional query results. In another embodiment, based on a user selection of a visual cue, only the group of query results associated with the selected visual cues (or portion thereof) are presented.

Accordingly, one embodiment of the present invention is directed to one or more computer-readable media storing computer-useable instructions that, when used by one or more computing devices, causes the one or more computing devices to perform a method of refining query results using visual cues. The method comprises receiving a user query; determining a first plurality of query results that satisfy the user query; generating one or more query result groups, each query result group containing one or more of the first plurality of query results; associating a visual cue with each of the one or more query result groups; and presenting at least a portion of the visual cues.

In another embodiment, the invention is directed to a method performed by one or more server devices for refining query results using visual cues. The method comprises receiving an indication of a first user query; determining a first plurality of query results that satisfy the first user query; categorizing one or more of the first plurality of query results into one or more query result groups; associating a visual cue with each of the one or more query result groups; and presenting at least a portion of the visual cues.

A further embodiment of the present invention is directed to one or more computer-readable media storing computer-useable instructions that, when used by one or more computing devices, causes the one or more computing devices to perform a method for refining query results using visual cues. The method comprises receiving an indication of a first user query; determining a first plurality of query results that satisfy the first user query; categorizing one or more of the first plurality of query results into one or more query result groups, wherein the one or more of the first plurality of query results contained in each particular query result group shares at least one similar feature; associating a visual cue with each of the one or more groups of query results; and presenting at least a portion of the visual cues, wherein each presented visual cue is selectable.

Having described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media accessible by the computing device 100 and includes both volatile and nonvolatile media, and removable and non-removable media, implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

As indicated previously, embodiments of the present invention are directed to refining query results using visual cues. A visual cue refers to a visual representation of one or more query results that may be grouped together. A visual cue may be a textual item, an image, or a combination of both a textual item and an image. In one embodiment, a visual cue representing a group of query results is based on an image and/or caption associated with one or more of the query results in the group. For example, a common image may be associated with a number of query results in a particular group. As such, the common image may be determined to accurately represent the entire group of query results as a visual cue. In one embodiment, an image visual cue may be a video or an animated GIF image which represents common images associated with a number of query results in the particular group.

In another embodiment, a visual cue may be a common phrase, or caption, associated with multiple results in a group of query results. As such, the caption may be used to represent the entire group of query results as a visual cue. In yet another embodiment, a visual cue associated with a group of query results may be based on a generic representation of the query results in the group. As such, the image or textual item associated as a visual cue may not be associated with any of the individual query result candidates in the group, but instead is a mere generic representation of the entire group as a whole.

In one embodiment, query results are grouped according to similar features and/or characteristics associated with the query results. For example, a portion of a group of multiple query results may be grouped together based on similar characteristics. This group of query results, as discussed above, may then be associated with a visual cue. Shared and/or similar characteristics refer to any number of characteristics that are common between two or more query results. By way of example only, and not limitation, similar characteristics may include such identifiable qualities as similar color of a query result, similar pattern of a query result, similar features of a query result (e.g. similar use of images, videos, text, and/or links to webpages, in a query result), similar content of a query result, and similar objects identified as associated with a query result. For example, twenty query results presented in response to a generic user query, among thousands of other query results, may all be related to the same or a substantially similar sub-topic. As such, the group of twenty query results associated with the same or substantially similar sub-topic may be grouped together into a smaller group of query results, and the smaller group may, in turn, be associated with a visual cue that represents the sub-topic.

In another embodiment, query results are categorized into groups of query results. Categorizing results refer to associating results based on any number of characteristics that are determined to be common between multiple user query results. For example, query results that are associated with color images may be identified as being part of a particular representative category. In another embodiment, a representative category may include query results that are associated with a particular topic, such as being associated with a particular medical condition.

In embodiments, categorizing query results into groups of query results includes identifying similar features and/or characteristics of the query results. By way of example only, and not limitation, similar characteristics may include a similar heading of two or more search results, a similar topic of two or more search results, a similar caption of two or more search results, and similar images of two or more query results.

Figure 2:
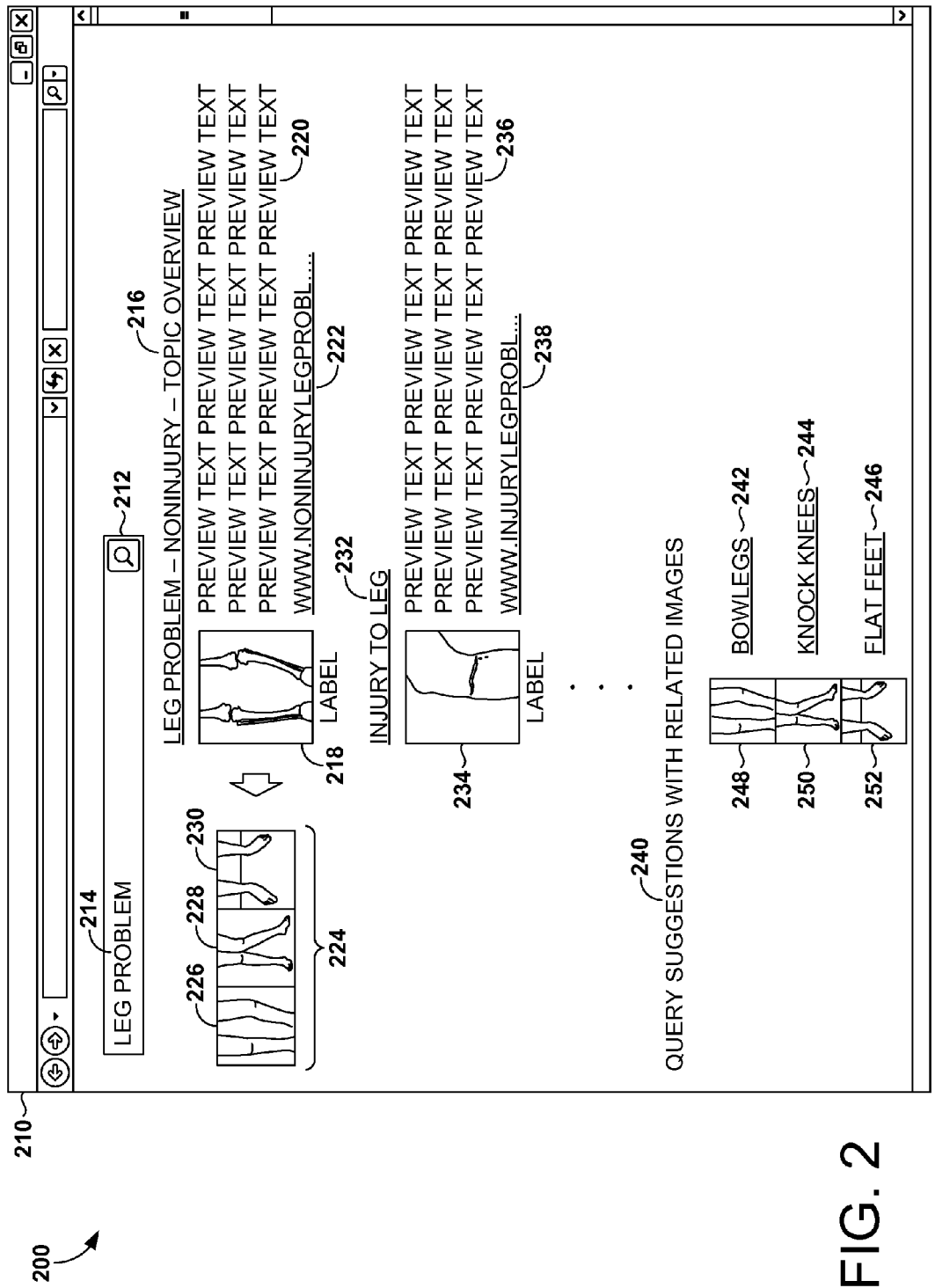
FIGS. 2-4 are illustrative displays of query results refined using visual cues, in accordance with embodiments of the present invention.

As shown in FIG. 2, an exemplary display 200 illustrates query results refined using visual cues on a search results webpage 210. Such refined query results are presented to a user, as in block 618 of FIG. 6. In FIG. 2, as part of the search results webpage 210, a query box 212 is used to receive an indication of a user query 214. In response to the user query 214, a query result 216 is displayed. Query result 216 generally includes a preview image 218, preview text 220, and a weblink 222. Also included in the search results webpage 210 is query result 232. Query result 232 generally includes a preview image 234, preview text 236, and a weblink 238. As will be understood, any number of query results, such as query results 216 and 232, may be included in the search results webpage 210. Further, such results may be presented in any number of ways, and may include some or all of the elements depicted in association with search results webpage 210. For example, a query result 216 may not include a preview image 218.

As shown in association with query result 216, a visual cue preview area 224 generally depicts representative visual cues associated with the results of user query 214. The visual cue preview area 224 includes visual cues 226, 228, and 230. As discussed above, visual cues are associated with groups of query results generated in response to a user query. As such, any number of query results are generated in response to user query 214, grouped, and associated with visual cues 226, 228, and 230. Additionally, the visual cue preview area 224 may include fewer or more visual cues than those depicted in display 200. Additionally, the search results webpage 210 may include a visual cue preview area 224 either in lieu of or in association with one or more query results, or some combination thereof.

One or more of visual cues 226, 228, and 230 may be selected by a user. For example, in response to selection of visual cue 226, the group of query results associated with visual cue 226 may be presented to a user. In another embodiment, upon selection of a visual cue, e.g., visual cue 226, a second user query is indicated in query box 212. This second query may be used to generate a refined set of query results. In embodiments, because visual cue 226 is associated a group of query results (which represent only a portion of the original query results), the visual cue 226 is therefore used to refine the results of user query 214.

A query suggestions area 240 is shown as part of the search results webpage 210. Any number of visual cues may be included in query suggestions area 240. As illustrated in FIG. 2, the query suggestion area 240 may include textual item visual cues 242, 244, and 246, and image visual cues 248, 250, and 252. In embodiments, a query suggestion area 240 includes one or both of image visual cues and textual item visual cues. In one embodiment, a textual item visual cue 246 may be selected by a user in response to entering user query 214 into query box 212. As will be understood, the visual cues included in visual cue preview area 224 may be the same as or different than the visual cues displayed as part of query suggestions area 240. Additionally, the search results webpage 210 may include a query suggestions area 240 either in lieu of or in association with one or more query results, or some combination thereof.

For example, a user may be seeking to distinguish a particular type of "leg problem" and may enter a user query 214 into a search results webpage 210 without knowing which particular leg problem the user intends to research. In one embodiment, as a result of grouping query results and associating visual cues with query results, the user may utilize a visual cue, such as image visual cue 252, to identify "flat feet" as the particular leg problem the user intended to enter. Further, the user may utilize an image visual cue 252, or a textual item visual cue 246, to refine a set of query results that pertain to the user's intended query.

Figure 3:
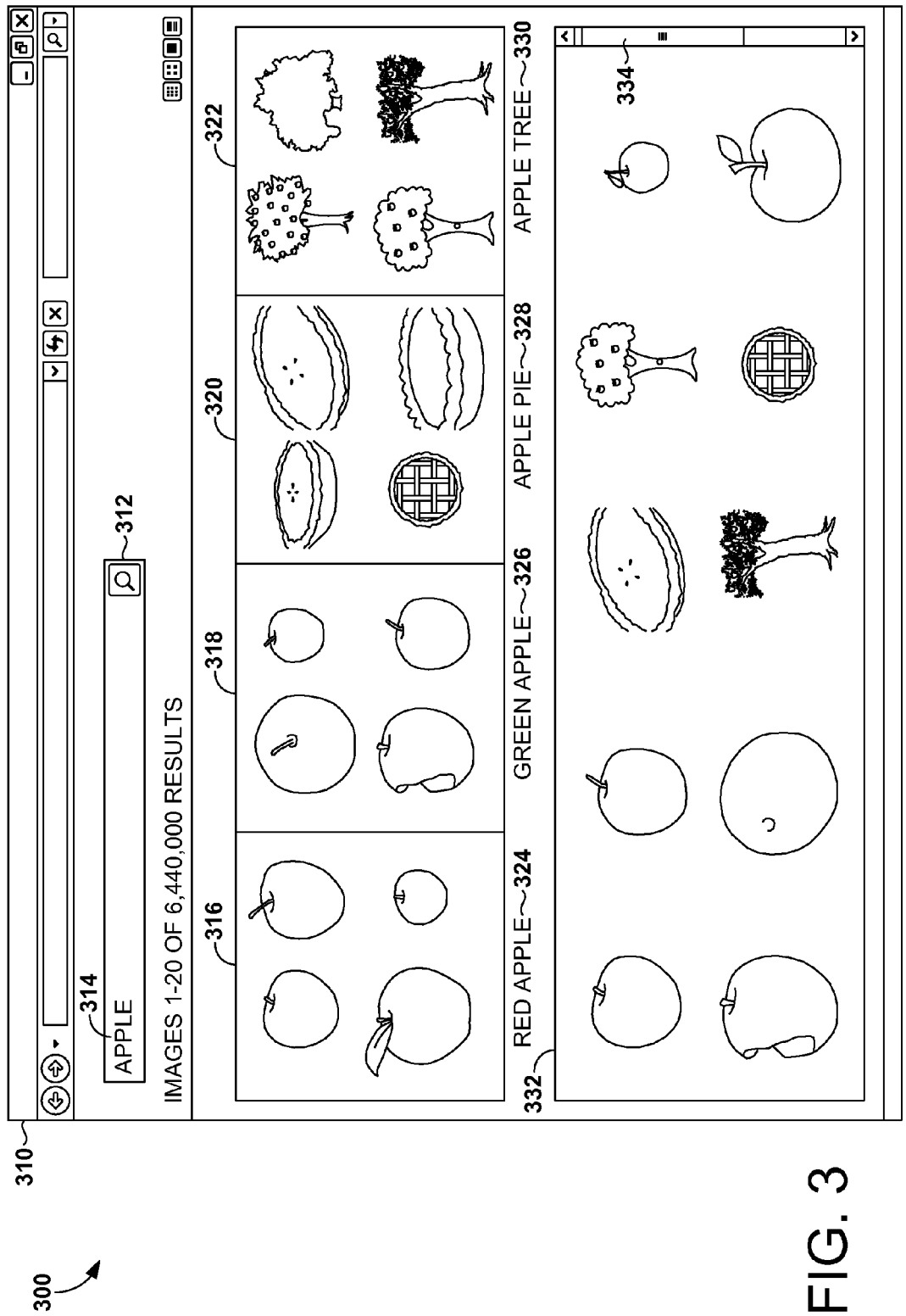

Referring now to FIG. 3, an exemplary display 300 illustrates query results refined using visual cues on a search results webpage 310. As part of the search results webpage 310, a query box 312 is used to receive an indication of a user query 314. In response to a user query 314, image visual cues 316, 318, 320, and 322 are displayed. Image visual cues 316, 318, 320, and 322 are associated with groups of query results, as previously discussed. The image visual cues 316, 318, 320 and 322 are also associated with textual item visual cues 324, 326, 328, and 330, respectively. The search results webpage 310 also includes a query result preview area 332 and a scroll bar 334. In one embodiment, a user may select an image visual cue, or a textual item visual cue, in order to refine the user query 314.

For example, having entered the ambiguous user query 314 of "apple," query results are returned that relate to various different types of apples. As shown in query results preview area 332, the various types of results returned in response to this query may not accurately display the results the user intended to retrieve. However, in one embodiment, the user may select a particular type of "apple" result, such as selecting the textual item visual cue 326 "green apple," to refine the user query to only results related to that particular group of query results associated with image visual cue 318. In another embodiment, a user may directly select one or both of the image visual cue 318 and the textual item visual cue 326 to generate a new user query in query box 312.

Figure 4:
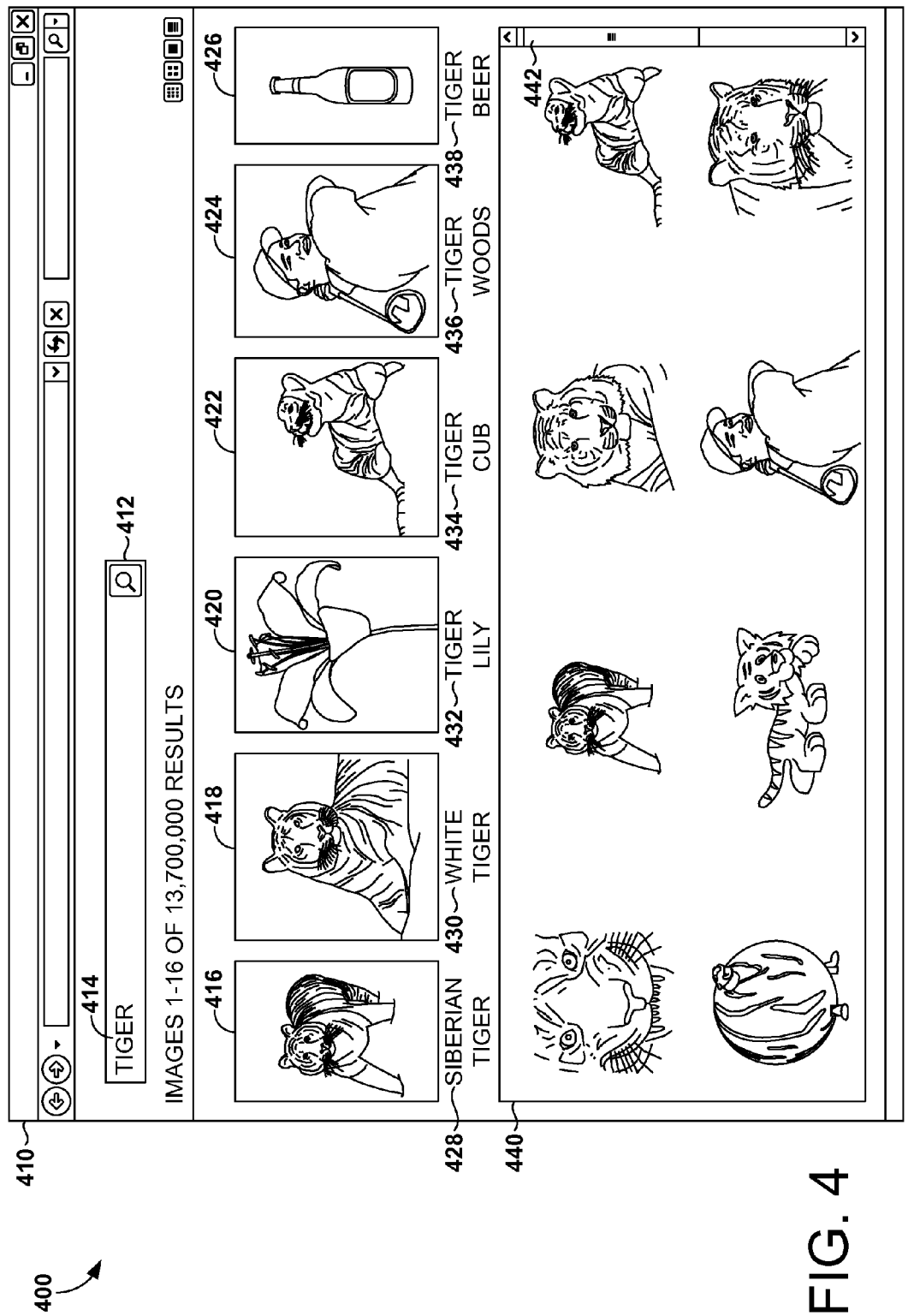

Turning now to FIG. 4, exemplary display 400 illustrates query results refined using visual cues on a search results webpage 410. As part of the search results webpage 410, a query box 412 is used to receive an indication of a user query 414. In response to a user query 414, image visual cues 416, 418, 420, 422, 424, and 426 are displayed. The image visual cues 416, 418, 420, 422, 424, and 426 are associated with textual item visual cues 428, 430, 432, 434, 436, and 438, respectively. The search results webpage 410 also includes a query result preview area 440 and a scroll bar 442.

In one embodiment, a user may select a particular query result group by selecting the corresponding image visual cue or textual item visual cue. As such, the selection of the visual cue is used to refine the user query 414. As shown in FIG. 4, the ambiguous user query 414 "tiger" generates various different types of query results associated with the word "tiger." To refine the user query 414, or disambiguate the user's intent, visual cues are presented in association with the various query results. For example, based on a user's selection of image visual cue 416 and/or selection of textual item visual cue 428, query results that are grouped together as being associated with image visual cue 416 and textual item visual cue 428 may be presented to a user. As such, a user who intended to enter "Siberian tiger" into query box 412 may refine the query results presented to only those relating to a particular group of query results by virtue of selecting a visual cue.

Figure 5:
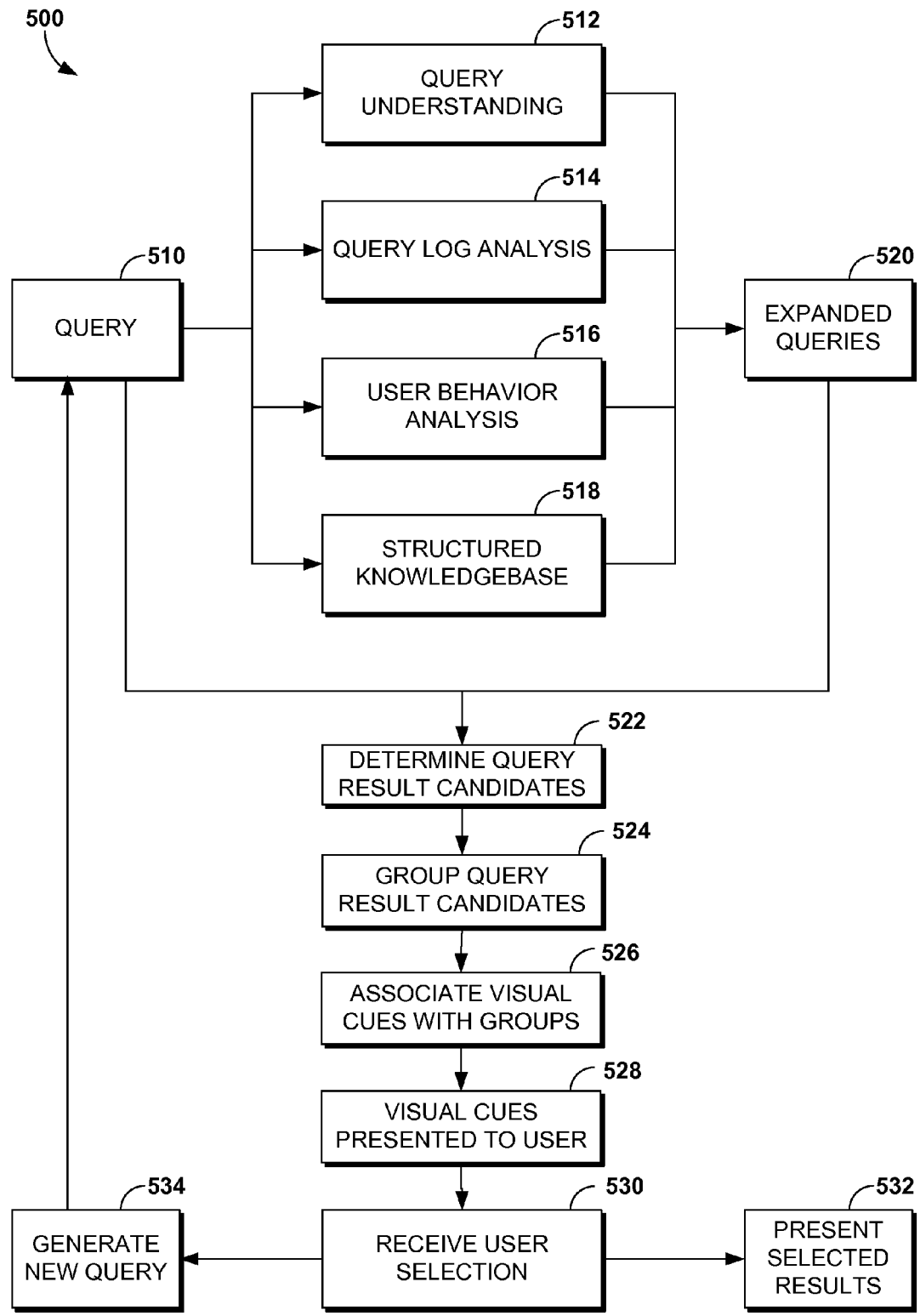
FIGS. 5-6 are flow diagrams showing methods for refining query results using visual cues, in accordance with an embodiment of the present invention.

With reference now to FIG. 5, a flow diagram is provided illustrating a method 500 for refining query results using visual cues. As shown at block 510, an indication of a user query is received. Based on the received indication of a user query, an expanded user query may be generated. As shown at block 512, query understanding may be used to generate an expanded query. Query understanding refers to any number of different types of information used to accurately understand an indication of a user query. For example, query understanding may include altering an indication of a user query, such as adding an "e" to the end of a user query for the word "appl," to make the query more complete.

At block 514, query log analysis may be used to generate an expanded query. Query log analysis refers to analysis conducted on a log of previously entered user queries. As shown at block 516, user behavior analysis may also be used to generate an expanded query. User behavior analysis refers to an analysis of user behavior with respect to previously entered user queries. At block 518, a structured knowledgebase may be used to generate an expanded query. A structured knowledgebase refers to the arrangement of data relating to potential query results for user queries, such as a database of suggestions for refining user queries. One or more of blocks 512, 514, 516, and 518 may be utilized to generate an expanded user query at block 520. As will be understood by one of skill in the art, any number of additional types of analysis may be included in generating an expanded user query.

As shown at block 522, the results of the user query received at block 510 and the results of expanded user query of block 520 may be used to determine query result candidates. In one embodiment, only the query result candidates that satisfy the original user query from block 510 are determined at block 522, without the creation of an expanded user query. In another embodiment, the query result candidates determined at block 522 includes both the results of the expanded user query from block 520 as well as the results of the original user query from block 510. In yet another embodiment, a user is given an option to select the results of either the original user query of block 510 or the results of the expanded user query of block 520.

The query result candidates determined at block 522 are then grouped into query result candidate groups at block 524. Based on the grouping of query result candidates at block 524, visual cues are associated with the grouped query results at block 526. At block 528, visual cues associated with grouped results are presented to a user. At block 530, a user selection of a visual cue is received. The query results associated with the selected visual cue are presented to a user at block 532. Alternatively, at block 534, a new (or second) user query is generated, based on the selected visual cue. As such, the new user query generated at block 534 returns the method to block 510.

Figure 6:
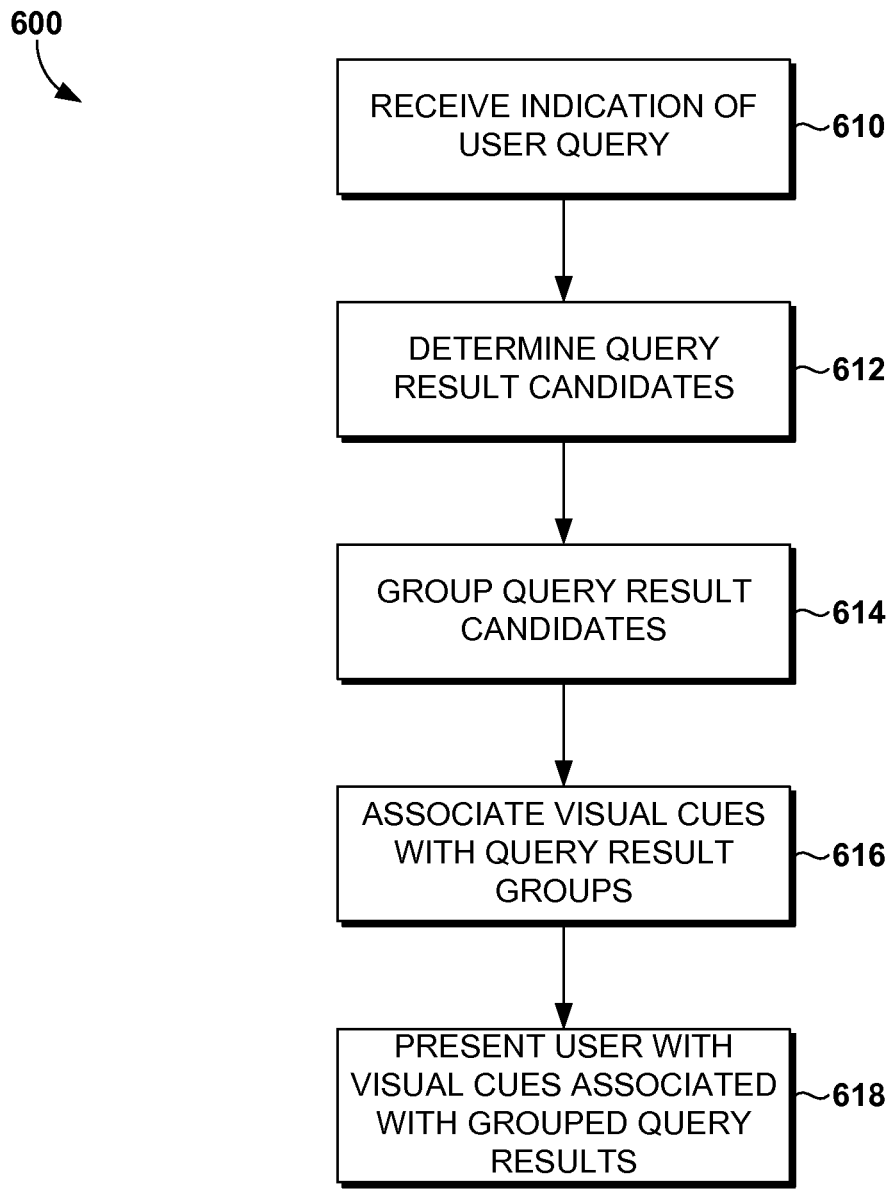

Referring next to FIG. 6, a flow diagram is provided illustrating a method 600 for refining query results using visual cues. At block 610, an indication of a user query is received. At block 612, query result candidates are determined for the indicated user query. As shown at block 614, query result candidates are grouped. As previously discussed, query result candidates may be grouped based on similar characteristics and/or common categories of results. At block 616, visual cues are associated with the grouped query result candidates. The visual cues may be images, textual items, or both images and textual items. At block 618, a user is presented with visual cues associated with grouped query results. As previously discussed, a user may select a visual cue, and the associated group of query results may subsequently be presented to a user.

As can be understood, embodiments of the present invention provide a method of refining a user query using visual cues. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer hardware storage media storing computer-useable instructions that, when used by one or more computing devices, cause the one or more computing devices to perform a method of refining query results using visual cues, the method comprising:

receiving a user query from a user;

determining a first plurality of query results that satisfy the user query from one or more search engines, each of the first plurality of query results comprising a preview image corresponding to each query result;

generating one or more query result groups, each query result group containing one or more query results from the first plurality of query results, wherein the one or more query results from the first plurality of query results are a coordinated set of query results that are identified as sharing at least one common characteristic that is associated with each of the one or more query results;

associating a visual cue with each of the one or more query result groups, wherein each visual cue associated with each of the one or more query result groups comprises a representative visual cue image derived from one or more preview images corresponding with the one or more query results associated with a corresponding query result group, wherein each representative visual cue image represents the one or more query results in the corresponding query result group;

presenting at least one portion of the one or more preview images in association with the one or more query results of the first plurality of query results;

presenting at least one portion of the visual cues in a visual cue preview area, wherein the visual cue preview area is separate from the presented at least one portion of the one or more preview images wherein each presented visual cue is selectable; and presenting a query suggestion area separate from the visual cue preview area and the presented at least one portion of the one or more preview images, wherein the query suggestion area comprises a plurality of image visual cues, wherein upon a user selection of an image visual cue from the query suggestion area, a refined user query is indicated, wherein the refined user query reflects the user's intent for the user query.

2. The one or more computer storage media of claim 1, wherein the indicating the refined user query comprises:
   in response to the user selection of the image visual cue from the query suggestion area,
   generating a second plurality of query results in response to the refined user query.

3. The one or more computer storage media of claim 1, wherein the at least one common characteristic includes one or more of:
   similar color;
   similar pattern;
   similar features;
   similar content; and
   similar objects.

4. The one or more computer storage media of claim 1, wherein the associating the visual cue with each of the one or more query result groups includes generating one or more of a representative image and a representative textual item associated with each of the one or more query result groups.

5. The one or more computer storage media of claim 1, wherein the one or more computing devices include one of a laptop computer, a monitor, a PDA, a smartphone, a tablet PC, and an electronic book.

6. A method performed by one or more server devices for refining query results using visual cues, the method comprising:
   receiving a user query from a user;
   determining a first plurality of query results that satisfy the user query from one or more search engines, each of the first plurality of query results comprising a preview image corresponding to each query result;
   generating one or more query result groups, each query result group containing one or more query results from the first plurality of query results, wherein the one or more query results from the first plurality of query results are a coordinated set of query results that are identified as sharing at least one common characteristic that is associated with each of the one or more query results;
   associating a visual cue with each of the one or more query result groups, wherein each visual cue associated with each of the one or more query result groups comprises a representative visual cue image derived from one or more preview images corresponding with the one or more query results associated with a corresponding query result group, wherein each representative visual cue image represents the one or more query results in the corresponding query result group;
   presenting at least one portion of the one or more preview images in association with the one or more query results of the first plurality of query results;
   presenting at least one portion of the visual cues in a visual cue preview area, wherein the visual cue preview area is separate from the presented at least one portion of the one or more preview images wherein each presented visual cue is selectable; and
   presenting a query suggestion area separate from the visual cue preview area and the presented at least one portion of the one or more preview images, wherein the query suggestion area comprises a plurality of image visual cues, wherein upon a user selection of an image visual cue from the query suggestion area, a refined user query is indicated, wherein the refined user query reflects the user's intent for the user query.

7. The method of claim 6, wherein the one or more query results of the first plurality of query results contained in each particular query result group share at least one similar feature.

8. The method of claim 7, wherein the at least one similar feature includes one or more of:
   a similar heading of two or more query results of the first plurality of query results;
   a similar topic of two or more query results of the first plurality of query results;
   a similar caption of two or more query results of the first plurality of query results; and
   a similar image of two or more query results of the first plurality of query results.

9. The method of claim 6, wherein one or more of the visual cues associated the one or more query result groups include both a representative textual item and the representative visual cue image.

10. The method of claim 6, further comprising:
    determining a second plurality of query results that satisfy the refined user query.

11. The method of claim 10, further comprising presenting the second plurality of query results that satisfy the refined user query to the user, wherein one or more of the second plurality of query results comprise a preview image.

12. The method of claim 6, further comprising presenting a particular group of the one or more query result groups, the particular group being associated with a selected one of the plurality of selectable visual cues.

13. The method of claim 6, further comprising automatically generating an indication of a second user query based on the one or more query results of the first plurality of query results.

14. The method of claim 13, further comprising determining a second plurality of query results that satisfy the second user query.

15. The method of claim 14, further comprising presenting the second plurality of query results that satisfy the refined user query to the user, wherein one or more of the second plurality of query results comprise a preview image.

16. A computing system comprising:
a processor implemented at least partially by hardware; and
computer storage memory having computer-executable instructions stored thereon which, when executed by the processor, implement a method for refining query results using visual cues, the method comprising:
receiving a user query from a user;
determining a first plurality of query results that satisfy the user query from one or more search engines, each of the first plurality of query results comprising a preview image corresponding to each query result;
generating one or more query result groups, each query result group containing one or more query results from the first plurality of query results, wherein the one or more query results from the first plurality of query results are a coordinated set of query results that are identified as sharing at least one common characteristic that is associated with each of the one or more query results;
associating a visual cue with each of the one or more query result groups, wherein each visual cue associated with each of the one or more query result groups comprises a representative visual cue image derived from one or more preview images corresponding with the one or more query results associated with a corresponding query result group, wherein each representative visual cue image represents the one or more query results in the corresponding query result group;
presenting at least one portion of the one or more preview images in association with the one or more query results of the first plurality of query results;
presenting at least one portion of the visual cues in a visual cue preview area, wherein the visual cue preview area is separate from the presented at least one portion of the one or more preview images wherein each presented visual cue is selectable; and
presenting a query suggestion area separate from the visual cue preview area and the presented at least one portion of the one or more preview images, wherein the query suggestion area comprises a plurality of image visual cues, wherein upon a user selection of an image visual cue from the query suggestion area, a refined user query is indicated, wherein the refined user query reflects the user's intent for the user query.

17. The computing system of claim 16, wherein the method further comprises:
determining a second plurality of query results that satisfy the refined user query.

18. The computing system of claim 16, wherein the associating the visual cue with each of the one or more query result groups includes generating one or more of a representative image and a representative textual item associated with each of the one or more query result groups.

19. The computing system of claim 16, wherein the one or more query results from the first plurality of query results contained in each particular query result group share at least one similar feature.

20. The computing system of claim 19, wherein the at least one similar feature includes one or more of:
similar color;
similar pattern;
similar features;
similar content; and
similar objects.

* * * * *